2,713,307
Patented July 19, 1955

2,713,307
OFFSET-PREVENTING COMPOSITIONS

George M. Adams, Palos Heights, Ill., assignor to The Visking Corporation, Chicago, Ill., a corporation of Virginia No Drawing. Application June 29, 1951,
Serial No. 234,461

8 Claims. (Cl. 101—416)

This invention relates to prevention of offset, which is described as the tendency of an undried ink to be transferred from the printed material to any other surface with which it comes in contact. More particularly, this invention relates to a new and improved composition for preventing offset.

U. S. Patent No. 2,235,676 discloses an offset-preventing composition comprising essentially an aqueous system of a water-insoluble amylaceous substance, such as starch, and a substantially nonadhesive hydrogel, such as bentonite. Such composition satisfactorily prevents offset but has the disadvantage in that it decomposes, i. e., darkens and/or becomes odoriferous, within a relatively short period of time, such as, in the neighborhood of twenty-four hours. As disclosed in the aforementioned patent, the offset-preventing composition can be stabilized against decomposition by incorporating formaldehyde therein. However, an offset-preventing composition containing formaldehyde is not suitable for use on materials intended to be used for wrapping and packaging of foodstuffs or in the processing of foodstuffs, such as meat, meat food products, cheese, etc.

An object of this invention is to provide an aqueous offset composition containing a substantially water-insoluble amylaceous substance and a substantially nonadhesive hydrogel having improved properties and which will not decompose for an appreciable period of time.

Another object of this invention is to provide an aqueous starch bentonite offset-preventing composition having improved properties and which will not decompose for an appreciable period of time.

An additional object of this invention is to provide an offset-preventing composition suitable for use with materials destined for wrapping, packaging and processing of comestibles.

Other and additional objects will become apparent hereinafter.

The objects of the invention are accomplished, in general, by incorporating gluconic acid in an aqueous offset-preventing composition containing a substantially water-insoluble amylaceous substance and a substantially non-adhesive hydrogel.

No special procedure for preparing the composition is necessary. The solid components of the composition may be admixed and after the mixture has been suspended in water, the gluconic acid may be incorporated in the system. Alternatively, the solid components may be added separately to the water.

Instead of using gluconic acid, a compound such as glucono-delta-lactone, which hydrolyzes to form gluconic acid, may be used. When such lactone is used, it may be admixed with the other solid ingredients or added separately, as desired. Preferably, it is admixed with the other ingredients to provide a dry mix which may be incorporated into water as desired.

Precisely what causes the decomposition (darkening and/or malodor) is not known. Likewise, precisely what phenomenon occurs by the addition of gluconic acid, or compound which produces gluconic acid upon contact with water, is not known. It has been found, however, that when gluconic acid, or a substance which forms gluconic acid upon contact with water, is added to offset compositions of the type herein described, the composition will be stabilized against darkening and malodor.

The details and manner of practicing the invention will become apparent by reference to the following specific example, it being understood that this example is merely an illustrative embodiment of the invention and that the scope of the invention is not limited thereto:

EXAMPLE

| | |
|---|---|
| Water | gals__ 68 |
| Bentonite (Volclay) | lbs__ 36 |
| Potato starch | lbs__ 175 |
| Glucono-delta-lactone | lbs__ 1–3 |

In the example, the final system will contain from approximately 0.13% to 0.39% gluconic acid.

The invention is not restricted to the precise proportions of components set forth in the example. The proportions of the components of the system may vary within rather wide limits. As illustrative of the various proportions of the starch, bentonite and water in such systems, attention is directed to U. S. Patent No. 2,235,376.

Relatively small quantities, such as 0.05%, of gluconic acid will produce compositions of improved stability.

In general, the larger the quantity of gluconic acid incorporated into the composition, the longer the period of time the composition will be stabilized or preserved. The following table shows the effects of incorporating various quantities of the preservative or stabilizer in offset preventing composition:

Table

| Example | Amount and Kind of Addition | Darkening Started | |
|---|---|---|---|
| | | Exposed to air | Covered and not exposed to air |
| 1 | None—control | <24 hrs | >24 hrs. |
| 2 | 0.25% of 50% aqueous gluconic acid solution | 2 days | 2 days. |
| 3 | 0.50% of 50% aqueous gluconic acid solution | 7 days | 2 days. |
| 4 | 1.0% of 50% aqueous gluconic acid solution | 7 days | >30 days. |
| 5 | 2% of 50% aqueous gluconic acid solution | 7 days | >30 days. |
| 6* | 5% of 50% aqueous gluconic acid solution | | >30 days. |
| 7* | 10% of 50% aqueous gluconic acid solution | | >30 days. |
| 8* | 0.125% Glucono-delta-lactone | | 5 days. |
| 9* | 0.25% Glucono-delta-lactone | | 5 days. |
| 10* | 0.50% Glucono-delta-lactone | | >7 days. |

* No observation made for "Exposed to Air."

In each of the examples of the table, the offset-preventing composition to which the preservative was added was as follows:

| | |
|---|---|
| Water | gals__ 68 |
| Bentonite (Volclay) | lbs__ 36 |
| Potato starch | lbs__ 175 |

Though as shown herein potato starch is the preferred starch, it is to be understood that the invention is not limited to the use of such particular type of starch. Grain starches, and more particularly corn starch, as well as other suitable starches, such as those derived from wheat, oats, rye, sago and tapioca may be used.

The offset-preventing composition of this invention is preferably applied by spraying, though it may be applied in any other known convenient manner.

The stabilized offset-preventing composition of this invention is capable of use with all types of inks. It has been successfully used in connection with printing of regenerated cellulose casings with drying-oil type inks and in connection with the printing of plastic film with inks of the type and nature set forth in U. S. Patent No. 2,544,873. Satisfactory results have been obtained when the composition was used in environments of atmospheric air, or air which has been contaminated with hydrogen sulphide liberated from, for example, in the regeneration of cellulose from viscose.

The invention provides an offset composition which is comparatively economical, easy to prepare and does not require any special equipment for its preparation or use. It does not in any way deleteriously affect the ink impressions on which it is applied, and can be used with printed material destined for the wrapping and packaging of foodstuffs, as well as in the processing of meat food products, cheese, etc.

Since it is obvious that various changes and modifications can be made in the above description without departing from the nature or spirit thereof, this invention is not restricted thereto except as set forth in the appended claims.

I claim:

1. An aqueous starch-bentonite offset-preventing composition containing gluconic acid as a stabilizer against decomposition.

2. An aqueous starch-bentonite offset-preventing composition containing at least 0.05% of gluconic acid as a stabilizer against decomposition.

3. An aqueous starch-bentonite offset-preventing composition containing approximately 0.1% to 5% gluconic acid as a stabilizer against decomposition.

4. An aqueous starch-bentonite offset-preventing composition containing approximately 0.13% to 0.39% gluconic acid as a stabilizer against decomposition.

5. A dry mix comprising starch, bentonite and glucono-delta-lactone and which when incorporated in water will produce an offset preventing composition stabilized against decomposition.

6. A dry mix comprising starch, bentonite and glucono-delta-lactone and which when incorporated in water will produce an offset-preventing composition containing at least .05% gluconic acid as a stabilizer against decomposition.

7. A dry mix comprising starch, bentonite and glucono-delta-lactone and which when incorporated in water will produce an offset-preventing composition containing approximately 0.1% to 5% gluconic acid as a stabilizer against decomposition.

8. A dry mix comprising starch, bentonite and glucono-delta-lactone and which when incorporated in water will produce an offset-preventing composition containing approximately 0.13% to .39% gluconic acid as a stabilizer against decomposition.

References Cited in the file of this patent

UNITED STATES PATENTS

| | | |
|---|---|---|
| 1,498,269 | Harris | June 17, 1924 |
| 1,942,660 | Pasternack | Jan. 9, 1934 |
| 2,059,399 | Rosner | Nov. 3, 1936 |
| 2,102,380 | Pasternack | Dec. 14, 1937 |
| 2,235,676 | Gardner | Mar. 18, 1941 |

OTHER REFERENCES

Thorpe's Dictionary of Applied Chemistry, 4th ed., 343.5, vol. II, page 297. Copy in Div. 59, Room 7099A.